(12) United States Patent
Lesak (10) Patent No.: US 7,109,621 B2
(45) Date of Patent: Sep. 19, 2006

(54) ELECTRIC MOTOR HAVING A PRINTED CIRCUIT BOARD ATTACHED TO A STATOR AND AT LEAST PARTIALLY SUPPORTING A BEARING

(75) Inventor: Alan E. Lesak, Franklin, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/923,229

(22) Filed: Aug. 20, 2004

(65) Prior Publication Data

US 2006/0038452 A1 Feb. 23, 2006

(51) Int. Cl.
H02K 5/16 (2006.01)
H02K 11/00 (2006.01)

(52) U.S. Cl. .................. 310/90; 310/42; 310/68 R
(58) Field of Classification Search .......... 310/216, 310/254, 49 R, 90, 68 R, 42, 91
See application file for complete search history.

(56) References Cited

U.S. PATENT DOCUMENTS

| | | | |
|---|---|---|---|
| 4,335,924 A * | 6/1982 | McCloskey | 384/203 |
| 4,633,110 A | 12/1986 | Genco et al. | |
| 4,668,898 A | 5/1987 | Harms et al. | |
| 4,773,829 A | 9/1988 | Vettori | |
| 4,779,330 A | 10/1988 | Genco et al. | |
| 4,806,808 A | 2/1989 | Grecksch et al. | |
| 4,853,568 A | 8/1989 | Fujiwara | |
| 4,855,849 A | 8/1989 | Jones et al. | |
| 4,934,041 A | 6/1990 | Hoover et al. | |
| 5,532,534 A | 7/1996 | Baker et al. | |
| 5,737,968 A | 4/1998 | Hardey et al. | |
| 5,744,886 A | 4/1998 | An | |
| 5,747,911 A | 5/1998 | Kikly | |
| 5,749,737 A | 5/1998 | Zuin | |
| 5,806,169 A | 9/1998 | Trago et al. | |
| 6,069,428 A | 5/2000 | Nelson | |
| 6,078,117 A | 6/2000 | Perrin et al. | |
| 6,175,171 B1 | 1/2001 | Rupp et al. | |
| 6,191,506 B1 | 2/2001 | Wright | |
| 6,215,210 B1 | 4/2001 | Hashimoto | |
| 6,239,532 B1 | 5/2001 | Hollenbeck et al. | |
| 6,414,408 B1 | 7/2002 | Erdman et al. | |
| 6,534,888 B1 | 3/2003 | Vorberg et al. | |
| 6,661,131 B1 | 12/2003 | Fukutani | |
| 6,747,381 B1 * | 6/2004 | Schach et al. | 310/89 |
| 6,809,452 B1 * | 10/2004 | Cho et al. | 310/216 |
| 2003/0098660 A1 | 5/2003 | Erdman et al. | |
| 2005/0122073 A1 * | 6/2005 | Mullin et al. | 318/254 |

OTHER PUBLICATIONS

A.O. Smith Electricl Products Company; Fractional Horsepower Motors and Specialty Blowers; Bulletin 7000; Jan. 2001; pp. 1-8, Tipp City, OH, USA.

* cited by examiner

Primary Examiner—Darren Schuberg
Assistant Examiner—David W. Scheuermann
(74) Attorney, Agent, or Firm—Michael Best & Friedrich LLP (57) ABSTRACT

An electric motor that includes a stator, a rotor including a rotor shaft and a support member coupled to the stator. A first bearing is at least partially disposed within the support member and a printed circuit board is coupled to the stator. A second bearing is at least partially disposed within the printed circuit board. The first bearing and the second bearing cooperate to support the rotor shaft for rotation relative to the stator.

32 Claims, 9 Drawing Sheets

ELECTRIC MOTOR HAVING A PRINTED CIRCUIT BOARD ATTACHED TO A STATOR AND AT LEAST PARTIALLY SUPPORTING A BEARING

BACKGROUND

The invention relates to an electric motor and method of assembling the same.

SUMMARY

In one embodiment, the invention provides an electric motor that includes a stator, a rotor including a rotor shaft, and a support member coupled to the stator. A first bearing is at least partially disposed within the support member and a printed circuit board is coupled to the stator. A second bearing is at least partially disposed within the printed circuit board. The first bearing and the second bearing cooperate to support the rotor shaft for rotation relative to the stator.

In another embodiment, the invention provides an electric motor that includes a stator having a stator opening. A rotor including a rotor shaft is disposed at least partially within the stator opening. A support member includes an inner surface and an outer surface. The stator is disposed adjacent the inner surface. A first bearing is disposed at least partially within the support member. A printed circuit board has an inner surface and an outer surface. The inner surface is disposed adjacent the stator. A second bearing is disposed at least partially within the printed circuit board. The first bearing and the second bearing cooperate to support the rotor shaft for rotation. A fastener extends from the inner surface of the first bearing support to the inner surface of the printed circuit board such that the fastener attaches the support member, the stator, and the printed circuit board.

The invention also provides a method of assembling an electric motor. The method includes supporting a first bearing in a support member and forming a bearing support portion on a printed circuit board, the bearing support portion including a bearing aperture. The method also includes inserting at least a portion of a second bearing in the bearing aperture, inserting at least a portion of a motor rotor in a stator opening, and engaging the rotor and the first bearing and the rotor and the second bearing such that the first bearing and the second bearing support the rotor for rotation. The method further includes engaging a fastener with the support member and the printed circuit board to fixedly attach the support member, the stator, and the printed circuit board to one another.

In another embodiment, the invention provides an electric motor that includes a stator, a rotor including a rotor shaft, and a support member coupled to the stator. A first bearing is at least partially disposed within the support member and a printed circuit board is coupled to the stator. A second bearing is at least partially supported by the printed circuit board. The first bearing and the second bearing cooperate to support the rotor shaft for rotation relative to the stator.

Other aspects and embodiments of the invention will become apparent by consideration of the detailed description and accompanying drawings.

BRIEF DESCRIPTION OF THE DRAWING

The detailed description particularly refers to the accompanying figures in which.

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
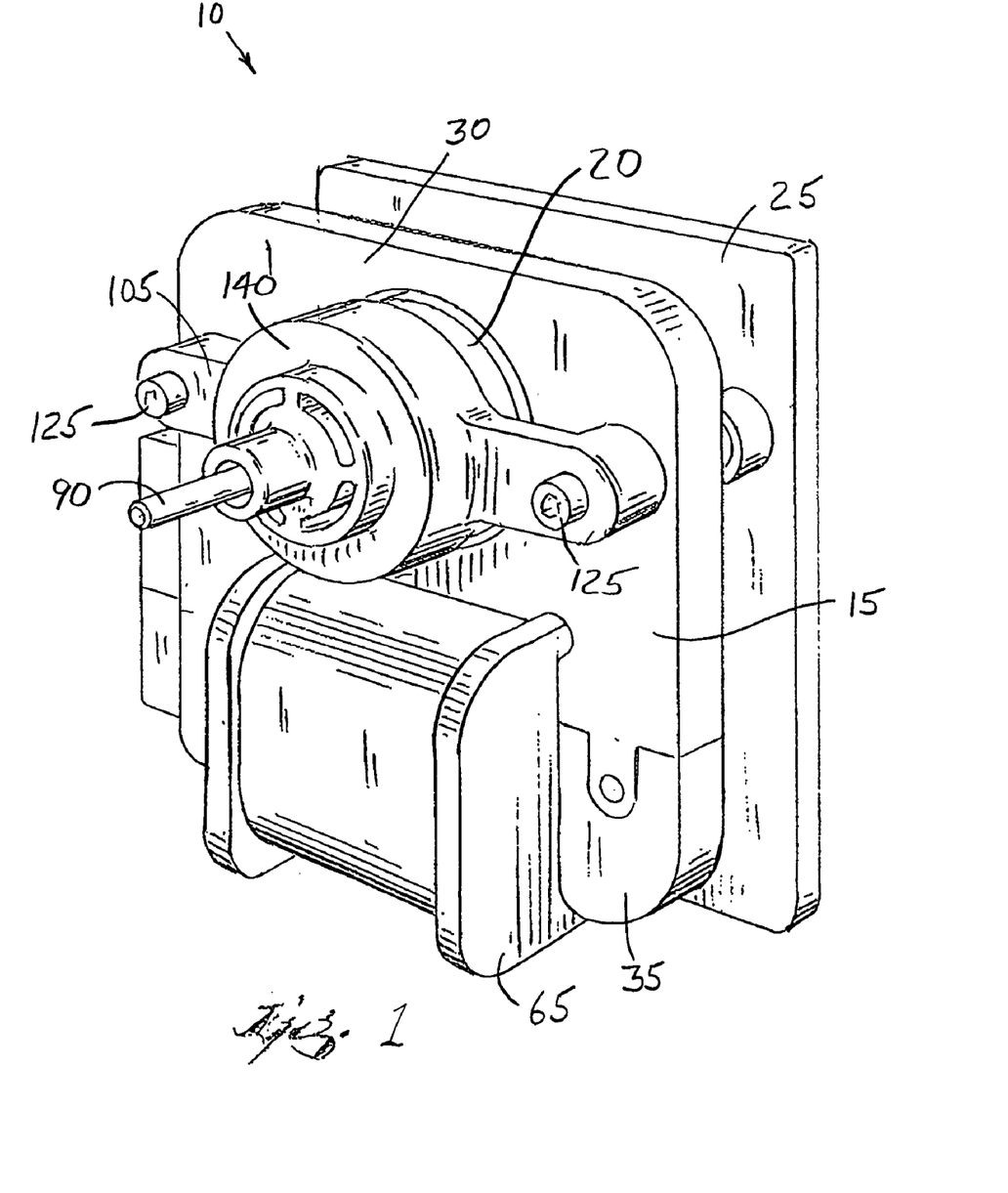
FIG. 1 is a perspective view of a motor including a circuit board.
Figure 2:
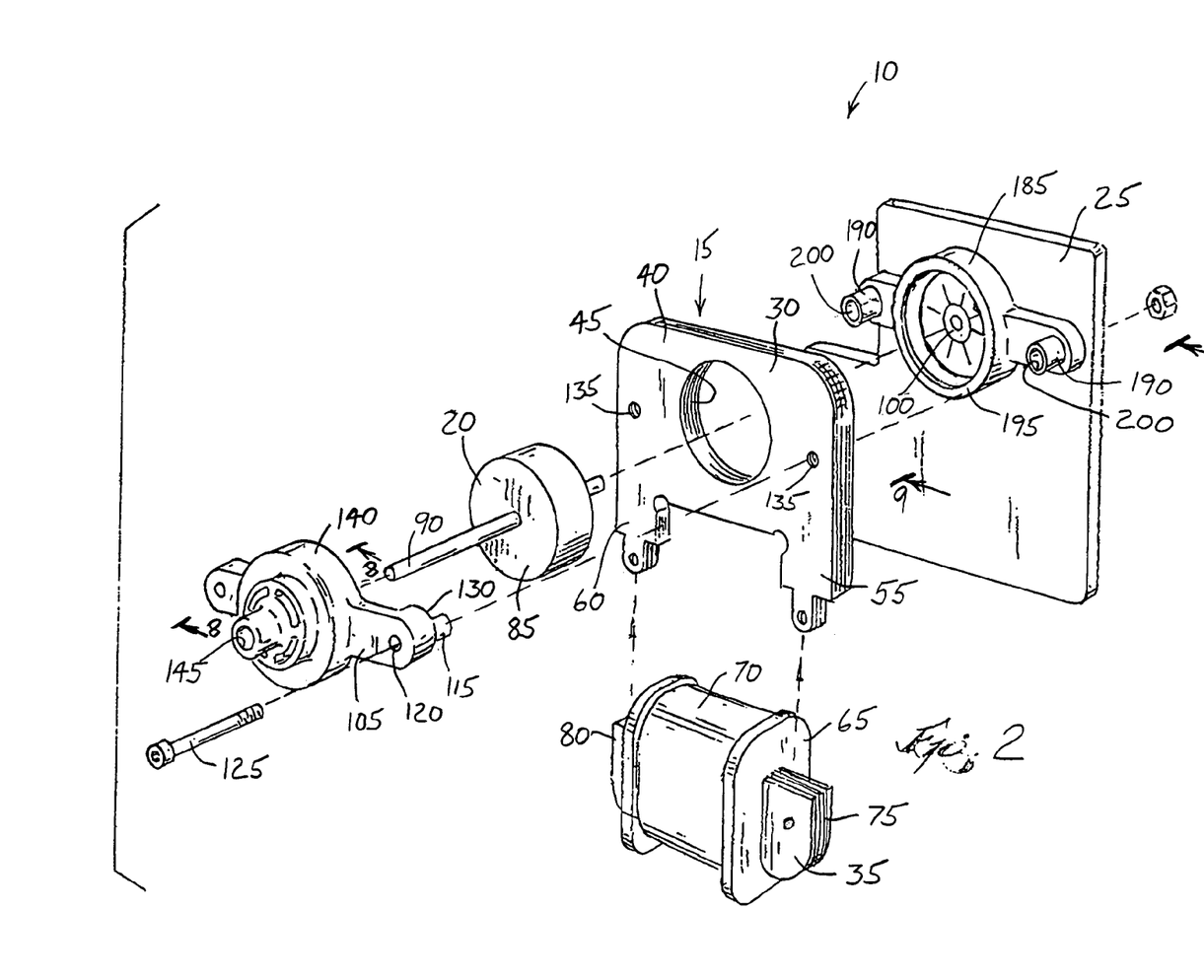
FIG. 2 is an exploded view of the motor of FIG. 1.

As shown in the FIGS. 1 and 2, a motor 10, in the form of a brushless DC C-frame motor, includes a stator 15, a rotor 20, and a printed circuit board 25. For the construction shown, the stator 15 includes a C-frame portion 30 and a bar portion 35. The C-frame portion 30 is formed from a plurality of laminations that are stacked in intimate contact and bonded to one another (e.g., welded, riveted, adhesive bonding, and the like). The C-frame portion 30 includes a first portion 40 that defines an aperture 45 that passes through the various laminations and is sized to receive the rotor 20. The aperture 45 at least partially defines two stator poles that interact with the rotor 20 to produce the desired rotor rotation, as is well known in the motor art. The C-frame portion 30 of the stator 15 also includes a first leg 55 and a second leg 66. The first and second legs 55, 60 extend from the ends of the first portion and are substantially perpendicular to the first portion 40.

The bar portion 35 is formed from a plurality of laminations that are in intimate contact and bonded to one another in a manner similar to that described with regard to the C-frame portion 30. The bar portion 35 supports a bobbin 65 that in turn supports a conductor 70. The conductor 70 is generally wound onto the bobbin 65 to define a plurality of turns or coils. The ends of the conductor 70 connect to the circuit board 25. The bar portion 35 includes a first end 75 that engages the first leg 55 and a second end 80 that engages the second leg 60. Once engaged, the first end 75 and the first leg 55 are in intimate contact and the second end 80 and the second leg 60 are in intimate contact. Thus, when a current is applied to the conductor 70, via the circuit board 25, a magnetic field is produced and directed by the bar portion 35 and the C-frame portion 30 to the poles that are at least partially defined by the aperture 45. The circuit board 25 controls the flow of current to the stator 15 to control the speed and direction of rotation of the rotor 20, as is well known in the motor art.

The rotor 20 includes a substantially cylindrical rotor core 85 and a rotor shaft 90 extending from both ends of the rotor core 85. The rotor core 85 includes a permanent magnet that defines two magnetic poles that fit within the aperture 45. Generally, the permanent magnets are formed from a permanently magnetic material such as sintered ferrite. However, other materials and constructions are possible. The two permanent magnetic poles interact with the stator 15 to produce rotor rotation.

The rotor shaft 90 is generally smaller in diameter than the rotor core 85 and supports the rotor core 85 for rotation. The rotor shaft 90 also provides a connection point between the motor 10 and the component being driven by the motor 10. Thus, shaft power is taken directly from the rotor shaft 90. In one construction, a single rotor shaft 90 passes through the core 85 and extends beyond each end of the core 85. In another construction, a separate shaft extends beyond each end of the core 85 to define the rotor shaft 90. For either construction, the rotor shaft 90 is coupled to the rotor core 85 in a manner that assures rotation of the rotor core 85 and rotor shaft 90 in unison.

The rotor 20 is supported for rotation by a first bearing 95 (shown in FIG. 4) and a second bearing 100 (shown in FIG. 2). The first bearing 95 engages the rotor shaft 90 on one side of the rotor core 85 and the second bearing 100 engages the rotor shaft 90 on the second side of the rotor core 85. The bearings 95, 100 can be simple journal bearings that support the rotor shaft for rotation and allow relatively free axial movement. In some construction, oil-impregnated brass or bronze journal bearings, or bushings, are employed. Of course, other bearing types (e.g., ball bearing, roller bearing, thrust bearing, etc.) or bearing arrangements can be used to support the rotor 20 for rotation. For example, two bearings could be positioned on one side of the rotor core 85 to support the rotor core 85 in a cantilever fashion. In addition, one of the bearings could be a combination roller and thrust bearing or a third bearing may be employed to accommodate any thrust load that may be produced during motor operation. The thrust bearing also would maintain the rotor 20 in the desired axial position relative to the stator 15. In some constructions, no thrust bearing is needed. Rather, the interaction of the magnetic fields between the stator 15 and the rotor 20 maintains the axial position of the rotor 20 within the stator aperture 45.

Figure 4:
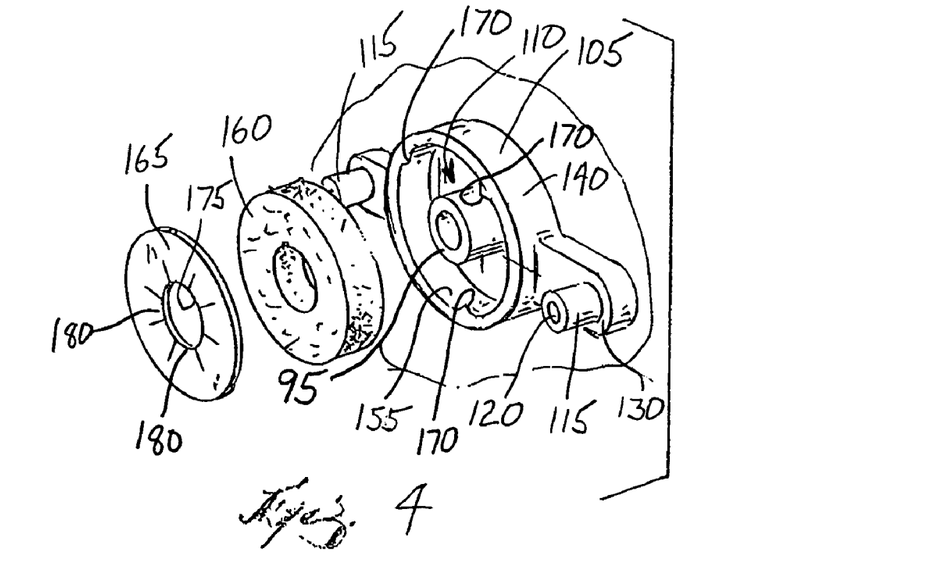
FIG. 4 is an exploded perspective view of a bearing assembly.
Figure 8:
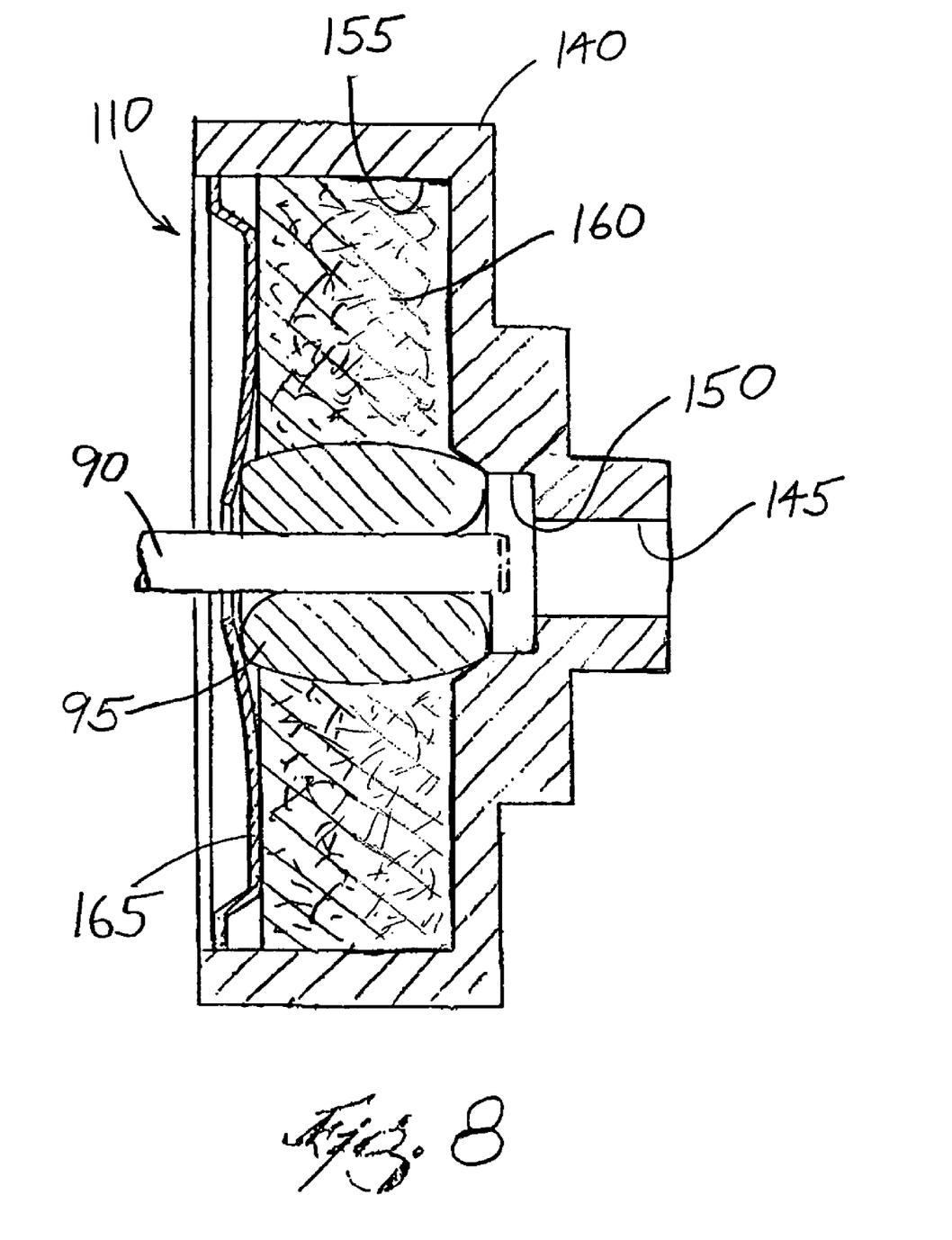
FIG. 8 is section view taken along line 8—8 of FIG. 2.

A support member 105 is positioned adjacent one end of the stator 15. The support member 105, shown in FIGS. 4 and 8, is generally formed from a metallic material, such as aluminum or steel. However, other materials (e.g., other metals, composites, plastics, and the like) could also be used to form the support member 105. The support member 105 includes a first bearing aperture 110 sized to receive the first bearing 95. The support member 105 also includes two integral standoffs 115 that each include a through bore 120 that receives an assembly fastener 125 (e.g., screw, bolt, stud, threaded rod, and the like as shown in FIG. 2). Each of the integral standoffs 115 also includes a shoulder 130 that contacts the stator 15 to locate the support member 105 in the proper axial position. Apertures 135 (FIG. 2) formed in the stator 15 engage a portion of the standoffs 115 to substantially fix the position of the support member 105 relative to the stator 15, while also allowing the passage of the assembly fasteners 125.

The bearing aperture 110 is formed within a bearing hub 140. The bearing hub 140 includes a through bore 145 that allows for the passage of the rotor shaft 90 through the support member 105. A first counter bore 150, concentric with the through bore 145, receives and supports a portion of the first bearing 95 such that the bearing 95 is able to pivot or move slightly. The movement allows the bearing 95 to move to accept a slight misalignment between the bearing 95 and shaft 90. A second counter bore 155, concentric with the first counter bore 150, is also formed within the hub 140. An oil-impregnated felt washer 160 is positioned within the second counter bore 155 such that the felt 160 surrounds the outer surface of the bearing 95. During operation, oil is able to seep from the felt 160 into the bearing 95 to provide lubrication between the rotor shaft 90 and the bearing 95.

A bearing retention washer 165 is positioned on top of the felt washer 160 within the second counter bore 155. The outer diameter of the bearing retention washer 165 engages lances 170 formed in the hub 140 of the support member 105 to firmly hold the bearing 95 and felt 160 in place. The bearing retention washer 165 includes a central opening 175 and several arms 180 that extend radially inward toward the center of the central opening 175. The arms 180 engage the bearing 95 and function much like a spring to allow limited axial movement of the bearing 95.

Figure 3:
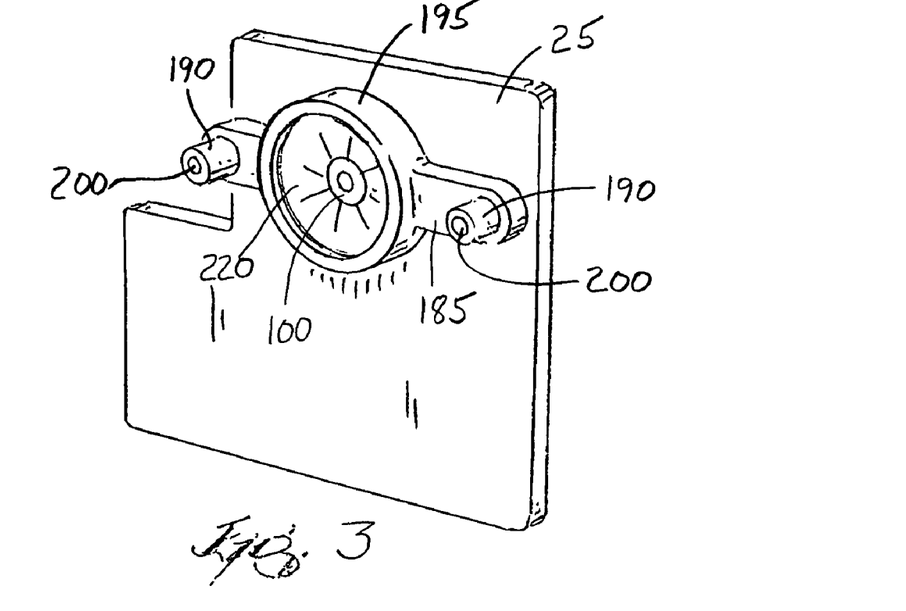
FIG. 3 is a perspective view of the circuit board of FIG. 1.
Figure 9:
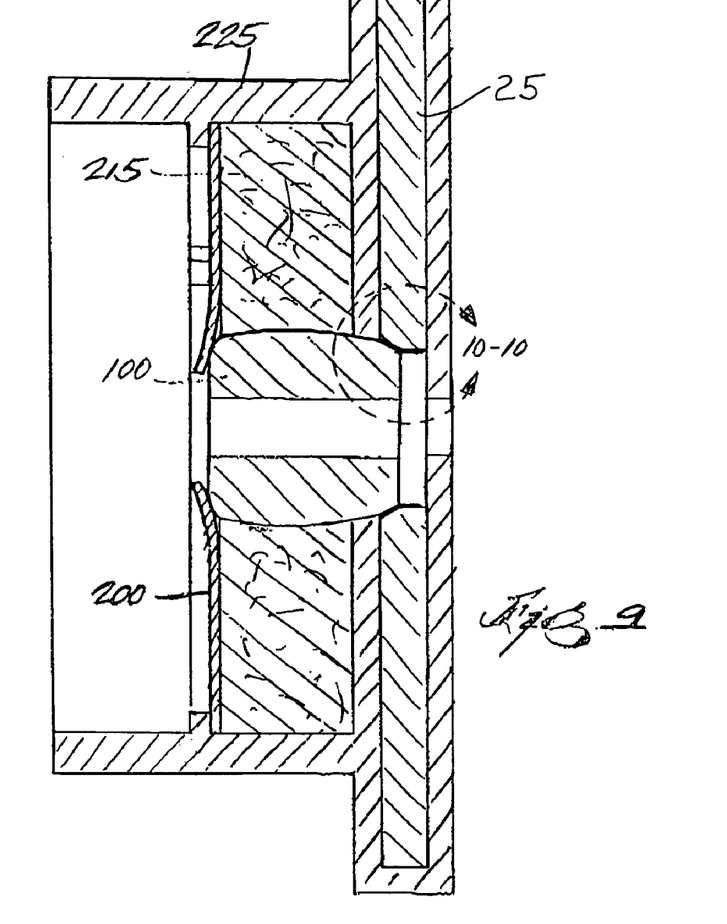
FIG. 9 is a section view taken along line 9—9 of FIG. 2.
Figure 10:
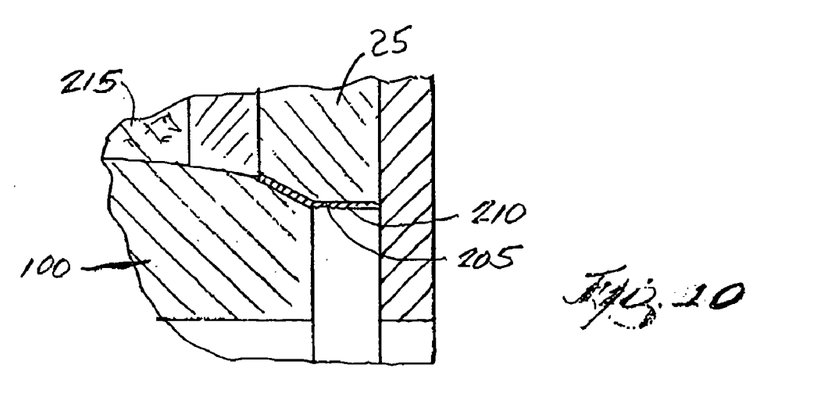
FIG. 10 is an enlarged view of a portion of the circuit board of FIG. 9.

The printed circuit board 25, illustrated in FIGS. 3 and 9–10, is positioned on the opposite side of the stator 15 as the support member 105 and supports the second bearing 100. The printed circuit board 25 also supports many of the electrical components needed to control the motor 10. The printed circuit board 25 includes a support portion 185 that is formed as part of the printed circuit board 25. In the illustrated construction, an insulative material (e.g., plastic, epoxy resin, ceramic, and the like) encases the circuit board 25 and forms the support portion 185. The support portion 185 includes two integral pins 190 and a hub 195. The integral pins 190 engage the same holes 135 in the stator 15 as the integral standoffs 115 of the support member 105 and include holes 200 that allow for the passage of the assembly fasteners 125. The integral pins 190 aid in positioning the printed circuit board 25 in the desired position relative to the stator 15. In other constructions, no support portion integral pins 190 are employed. Rather, the assembly fasteners 125 perform the alignment function. It should be noted that the integral standoffs 115 of the support member 105 or the integral pins 190 of the support portion 185 could include threads sized to receive the assembly fasteners 125. The use of threaded standoffs or threaded pins could eliminate the need for a nut or other assembly hardware.

The hub 195 includes a through bore 205 that allows for the passage of the rotor shaft 90 and also at least partially supports the second bearing 100. In some constructions, a wear-resistant layer 210, shown in FIG. 10, is positioned between the bore 205 in the printed circuit board 25 and the bearing 100. The wear-resistant layer 210 inhibits wear that, if allowed to occur, would quickly reduce the support the printed circuit board provides to the bearing 100. The reduced support could lead to shaft misalignment and binding, additional wear, and excessive rotor vibration. The wear resistant layer 210 can be positioned within the bore 205 using several different processes, with electroplating being preferred. Electroplating allows the accurate application of a relatively consistent thickness of metal, or other wear-resistant material, to the printed circuit board 25. In other constructions, the wear resistant layer 210 is formed as part of an insert or is cast or formed directly in place.

Like the first bearing 95, the second bearing 100 is shaped and supported to allow it to pivot or rotate slightly to accommodate a slight misalignment between the rotor shaft 90 and the bearing 100. A second oil-impregnated piece of felt 215 surrounds the second bearing 100 and delivers oil to the bearing 100 for lubrication. A second bearing retaining washer 220, similar to the first bearing retaining washer 165, is positioned over the felt 215 and the bearing 100. The insulative material is formed over the outer perimeter of the bearing retaining washer 220 to hold the second bearing 100, the felt 215, and the second bearing retaining washer 220 in place.

The insulative material that defines the hub 195 extends away from the printed circuit board 25 and defines an annular wall 225. The annular wall 225 contacts the stator 15 when the motor 10 is assembled to position the bearing 100 and the printed circuit board 25 the desired distance from the stator 15. Thus, the annular wall 225 performs an alignment function by maintaining the desired axial spacing between the printed circuit board 25 and the stator 15.

Figure 5:
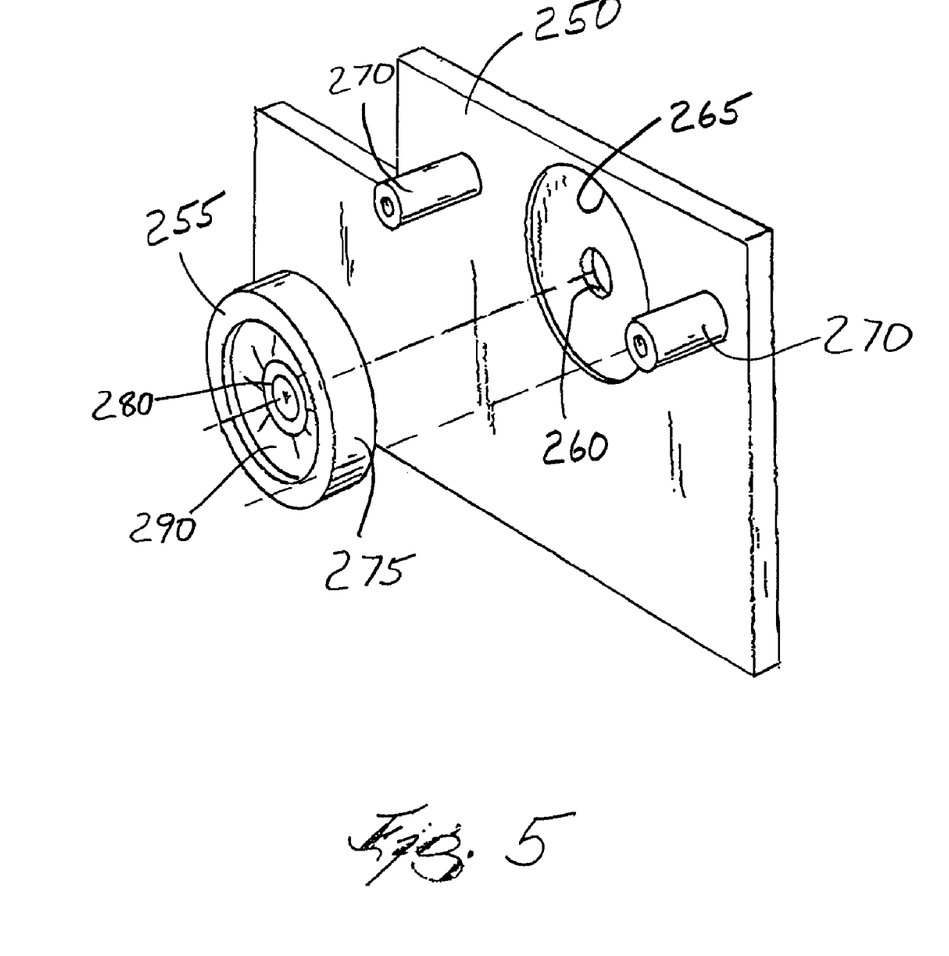
FIG. 5 is an exploded perspective view of another circuit board and bearing assembly.
Figure 6:
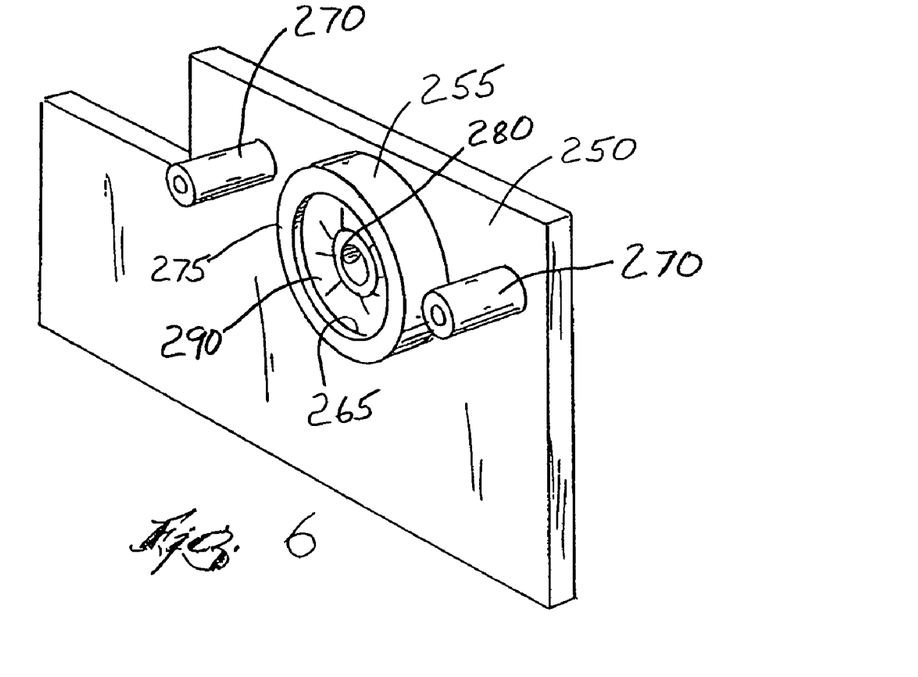
FIG. 6 is a perspective view of the assembled circuit board and bearing assembly of FIG. 5.
Figure 7:
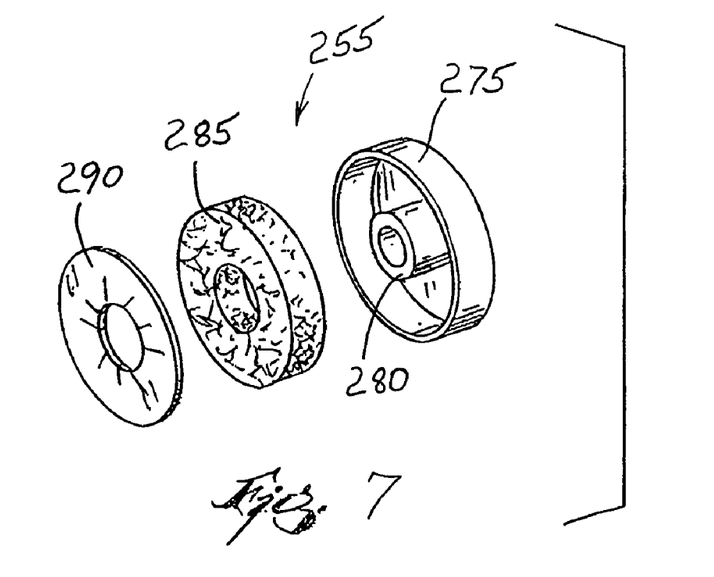
FIG. 7 is an exploded perspective view of the bearing assembly of FIG. 5.

Another construction of a printed circuit board 250 that supports a second bearing assembly 255 is illustrated in FIGS. 5–7. The printed circuit board 250 includes a through bore 260 that accommodates the passage of the rotor shaft 90 through the circuit board 250. The circuit board 250 also includes a counter bore 265 positioned concentric with the through bore 260 and sized to receive the second bearing assembly 255. Two standoffs 270 are positioned on the surface of the circuit board 250 and are sized to space the circuit board 250 a desired distance from the stator 15. The standoffs 270 can be attached to the circuit board 250 or the stator 15 using any suitable means including, but not limited to, adhesives, epoxy, or fasteners. In addition, the standoffs 270 can be supported by the assembly fasteners 125 without being attached to either the circuit board 250 or the stator 15.

The bearing assembly 255 includes a bearing retainer 275 that has a through bore that allows for the passage of the rotor shaft 90. A bearing 280 is positioned within the bearing retainer 275 and is surrounded by an oil impregnated felt washer 285. A bearing retaining washer 290 covers the felt washer 285 and engages the outer edge of the bearing retainer 290 to hold the bearing 280 in the desired position.

The circuit board 250 supports the bearing assembly 255 within the counter bore 265. The bearing assembly 255 can be attached to the printed circuit board 250 (e.g., fasteners, adhesive, epoxy, and the like) if desired. In some constructions, the bearing assembly 255 contacts both the stator 15 and the printed circuit board 250 such that no attachment between the circuit board 250 and the bearing assembly 255 is needed.

Figure 11:
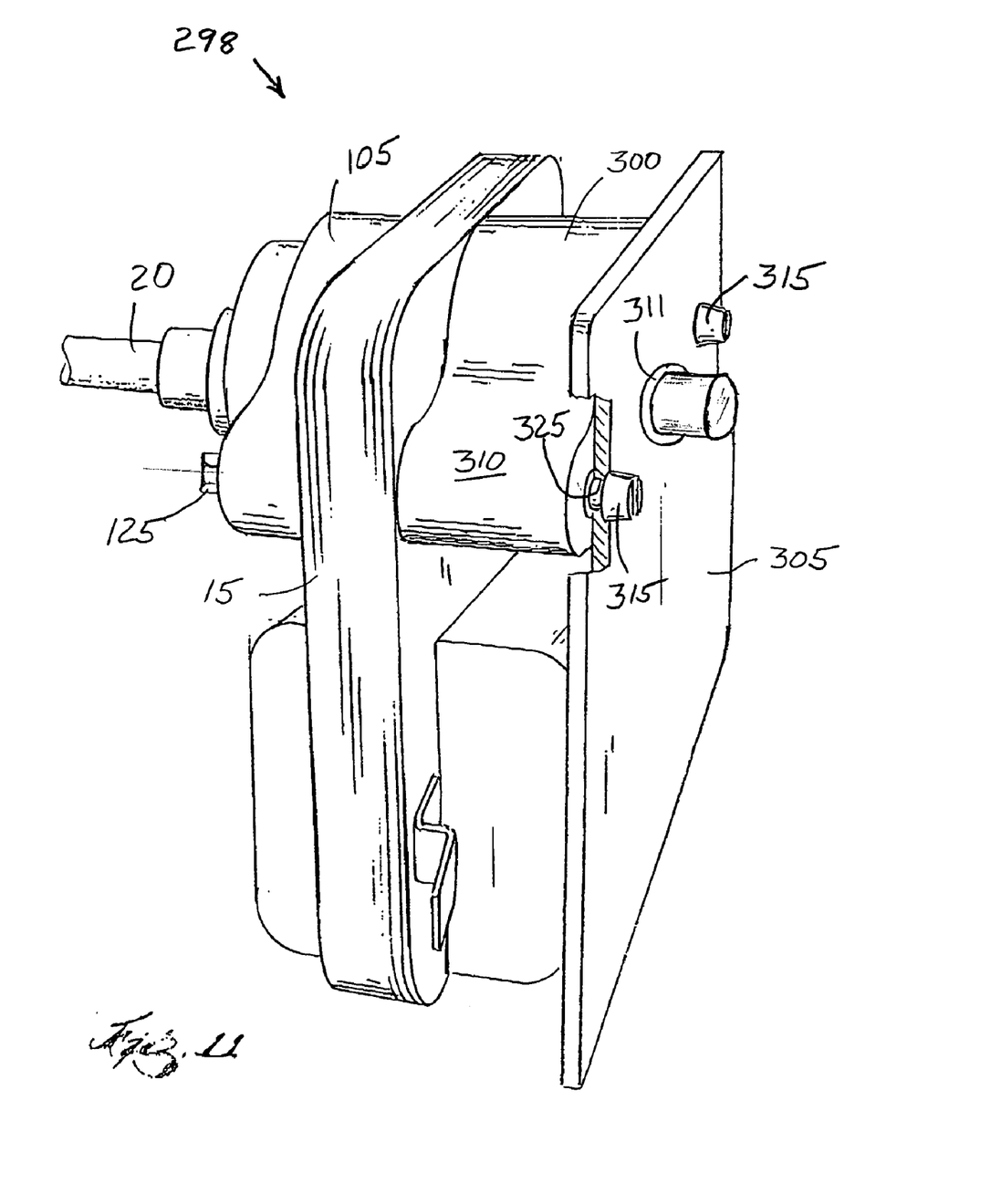
FIG. 11 is a perspective view of another motor including a circuit board.
Figure 12:
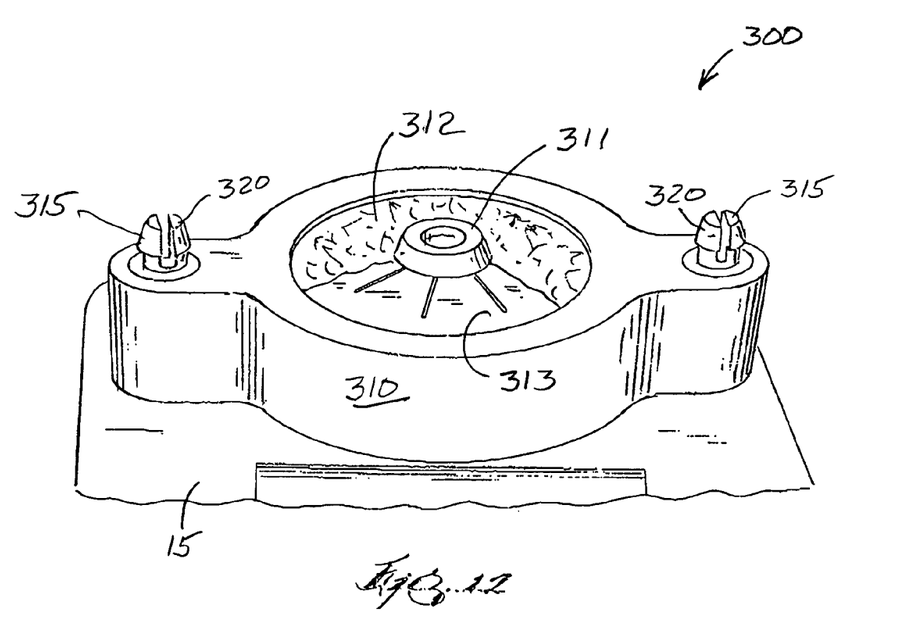
FIG. 12 is a perspective view of a bearing assembly of the motor of FIG. 11.

FIGS. 11–12 illustrate another construction of a motor 298 that includes a second bearing assembly 300. The second bearing assembly 300 is similar to the support portion 185 as illustrated in FIGS. 1–3. However, unlike the support portion 185, the second bearing assembly 300 is fixedly attached to the motor stator 15, rather than a printed circuit board 305. The second bearing assembly 300 includes a body portion 310 that can be formed from any desirable material including metals or plastics. In preferred constructions, the body portion 310 is formed or molded from a plastic material using a suitable process, such as injection molding. Generally, the second bearing housing 300 attaches to the stator 15 with the aid of an adhesive. However, other suitable methods of attachment could be employed if desired.

The second bearing assembly 300 includes a bearing 311, an oil-impregnated felt washer 312, and a bearing retention washer 313 arranged in much the same way as has been described with regard to the constructions of FIGS. 2–4. As such, these elements of the second bearing assembly 300 will not be described in detail.

The second bearing assembly 300 also includes two push fasteners 315 that extend from one side of the body portion 310. The push fasteners 315 may be aligned with the assembly fasteners 125, offset relative to the assembly fasteners 125, or rotated relative to the assembly fasteners 125. The push fasteners 315 include a mushroom-shaped split head 320 that can be pushed into an aperture 325 formed in the printed circuit board 305. Once the head 320 is pushed through the aperture 325, it expands slightly and engages the aperture 325 to inhibit unwanted removal. In this way, the two push fasteners 315 engage the circuit board 305 and attach it to the stator 15. The push fasteners may also include barbs or other attachment devices that engage the body portion 310 as the fasteners are inserted into the body portion or engage the body portion 310 as the body portion 310 is formed.

The second bearing assembly 300 may also include two sleeves (not shown) embedded within the body portion 310 or formed as part of the body portion 310. The sleeves may include threads or other suitable engagement means to engage the assembly fasteners 125. In constructions in which the body portion 310 is formed from a soft material (e.g., plastic), metal sleeves may be used to assure that the assembly fasteners 125 remain engaged with the body portion 310. In constructions in which the body portion 310 is formed from metal or other suitable materials, the sleeves may be omitted.

To assemble the motor 10, the printed circuit 25 board is first prepared. Specifically, the necessary electrical components are positioned and attached to the board 25. After any testing is performed, the printed circuit board 25 is positioned within a mold and encased in the insulative material. The mold forms the support portion 185, while insulating and protecting the components attached to the printed circuit board 25. In constructions that use the circuit board 250 and bearing assembly 255 of FIGS. 5-7, the second bearing assembly 255 is assembled and attached or positioned within the counter bore 265 of the printed circuit board 250.

The support member 105 is formed using a casting process, such as die-casting or investment casting in conjunction with some machining operations. Of course, other manufacturing techniques such as other casting methods, forging or machining alone could be used to form the support member 105.

The stator 15 is assembled by stacking the C-shaped laminations to define the C-frame portion 30 of the stator 15. The conductor 70 is wound onto the bobbin 65 and the laminations that make-up the bar portion 35 are positioned within the bobbin 65. The C-frame portion 30 and the bar portion 35 are then riveted together to complete the stator 15.

The assembled stator 15 is positioned on the printed circuit board 25 such that the integral pins 190 pass at least partially through the apertures 135 in the stator 15. The rotor 20, including the rotor shaft 90, is positioned in its operating position within the assembled stator 15. One end of the rotor shaft 90 extends into the support portion 185 of the printed circuit board 25 and engages the second bearing 100. The support member 105 slides over the opposite end of the rotor shaft 90 such that the first bearing 95 engages the shaft 90. The support portion 185 moves into contact with the stator 15 such that the stator 15 is sandwiched between the support member 105 and the printed circuit board 25. The assembly fasteners 125 pass through the support member 105, the stator 15, and the printed circuit board 25 and are fastened using nuts at one or both ends. Once tightened, only the assembly fasteners 125 attach the printed circuit board 25, the stator 15, and the support member 105. In this way, only two fasteners 125 are needed to hold the motor assembly together.

To assemble the motor illustrated in FIGS. 11–12, the rotor 20 and stator 15 are first assembled as described with regard to FIGS. 1–10. A first bearing is supported within the first bearing assembly support member 105 in much the same was as has already been described. The second bearing assembly 300 is assembled and bonded or otherwise attached to the stator 15. The assembly fasteners 125 attach the first bearing assembly support member 105 to the stator 15. The assembly fasteners 125 engage the second bearing assembly body portion 310 to attach the first bearing assembly support member 105 to the stator 15. Once, the assembly fasteners 125 are fully engaged, the adhesive that attaches the second bearing assembly 300 to the stator 15 performs no function. As such, some constructions may omit the adhesive. The push fasteners 315 engage the printed circuit board 305 to attach the board 305 to the stator 15 and complete the assembly. Before concluding, it is noted that the order of the steps described in the aforementioned methods of assembling the motor could vary. In addition, some of the steps described can be omitted or other steps not described can be added. For example, the use of adhesive to attach the second bearing assembly 300 to the stator 15 could be omitted in some constructions. As such, the aforementioned methods should not be limited to the steps described or the order in which they are described.

Thus, the invention provides, among other things, a new and useful electric motor 10 and method of assembling the electric motor 10. The constructions of the motor 10 and the methods of assembling the motor 10 described above and illustrated in the figures are presented by way of example only and are not intended as a limitation upon the concepts and principles of the invention. Various features and advantages of the invention are set forth in the following claims.

What is claimed is:

1. An electric motor comprising:
a stator;
a rotor comprising a rotor shaft;
a support member coupled to the stator;
a first bearing at least partially disposed within the support member;
a printed circuit board coupled to the stator; and
a second bearing directly supported by and in direct contact with the printed circuit board, the first bearing and the second bearing cooperating to support the rotor shaft for rotation relative to the stator, wherein the electric motor further comprises a fastener connecting the support member to the stator and the printed circuit board to the stator.

2. An electric motor as set forth in claim 1 wherein the stator is arranged to define a C-frame motor.

3. An electric motor as set forth in claim 1 wherein the rotor comprises a rotor core and the rotor shaft comprises a first end on a first side of the core and a second end on a second side of the core, the second side opposite the first side, the first bearing coupled to the first end and the second bearing coupled to the second end.

4. An electric motor as set forth in claim 1 wherein each of the first bearing and the second bearing is one of a journal bearing and a roller bearing.

5. An electric motor as set forth in claim 1 wherein the printed circuit board comprises a bearing surface that defines an aperture sized to receive at least a portion of the second bearing.

6. An electric motor as set forth in claim 5 wherein the printed circuit board comprises a wear-resistant layer disposed between the bearing surface and the second bearing.

7. An electric motor as set forth in claim 6 wherein the wear-resistant layer is plated to the bearing surface.

8. An electric motor as set forth in claim 1 wherein the fastener passes through the support member and the printed circuit board.

9. An electric motor as set forth in claim 1 wherein the printed circuit board completely supports the second bearing.

10. An electric motor as set forth in claim 1 wherein the printed circuit board and the stator cooperate to inhibit movement of the bearing in a direction parallel to the rotor shaft and the printed circuit board substantially inhibits movement of the second bearing perpendicular to the rotor shaft.

11. An electric motor comprising:
a stator comprising a stator opening;
a rotor comprising a rotor shaft, the rotor disposed at least partially within the stator opening;
a support member comprising an inner surface and an outer surface, the stator disposed adjacent the inner surface;
a first bearing disposed at least partially within the support member;
a printed circuit board comprising an inner surface and an outer surface, the inner surface disposed adjacent the stator;
a second bearing directly supported by the printed circuit board, the first bearing and the second bearing cooperating to support the rotor shaft for rotation; and
a fastener extending from the inner surface of the first bearing support to the inner surface of the printed circuit board such that the fastener attaches the support member, the stator, and the printed circuit board.

12. An electric motor as set forth in claim 11 wherein the stator is arranged to define a C-frame motor.

13. An electric motor as set forth in claim 11 wherein the rotor comprises a rotor core and the rotor shaft comprises a first end on a first side of the core and a second end on a second side of the core, the second side opposite the first side, the first bearing coupled to the first end and the second bearing coupled to the second end.

14. An electric motor as set forth in claim 11 wherein each of the first bearing and the second bearing is one of a journal bearing and a roller bearing.

15. An electric motor as set forth in claim 11 wherein the printed circuit board comprises a bearing surface that defines an aperture sized to receive at least a portion of the second bearing.

16. An electric motor as set forth in claim 11 wherein the fastener extends from the outer surface of one of the support member and the printed circuit board to the inner surface of the other of the support member and the printed circuit board.

17. An electric motor as set forth in claim 11 wherein the fastener extends from the outer surface of the support member to the outer surface of the printed circuit board.

18. An electric motor as set forth in claim 11 wherein the electric motor further comprises a plurality of fasteners that cooperate to fixedly connect the support member, the stator, and the printed circuit board.

19. An electric motor as set forth in claim 11 wherein the second bearing is in direct contact with the printed circuit board.

20. An electric motor as set forth in claim 19 wherein the printed circuit board includes a board portion and an encasement portion substantially encasing the board portion, the second bearing in direct contact with the encasement portion.

21. An electric motor comprising:
a stator comprising a stator opening;
a rotor comprising a rotor shaft, the rotor disposed at least partially within the stator opening;
a support member comprising an inner surface and an outer surface, the stator disposed adjacent the inner surface;
a first bearing disposed at least partially within the support member;
a printed circuit board comprising an inner surface and an outer surface, the inner surface disposed adjacent the stator;
a second bearing at least partially directly supported by at least one of the printed circuit board and the stator, the first bearing and the second bearing cooperating to support the rotor shaft for rotation; and
a fastener extending from the inner surface of the first bearing support to the inner surface of the printed circuit board such that the fastener attaches the support member, the stator, and the printed circuit board, wherein the printed circuit board comprises a bearing surface that defines an aperture sized to receive at least a portion of the second bearing, and wherein the printed circuit board comprises a wear-resistant layer disposed between the bearing surface and the second bearing.

22. An electric motor as set forth in claim 21 wherein the wear-resistant layer is plated to the bearing surface.

23. An electric motor comprising:
a stator;
a rotor comprising a rotor shaft;
a support member coupled to the stator;
a first bearing at least partially disposed within the support member;
a printed circuit board coupled to the stator; and
a second bearing directly supported by and in direct contact with the printed circuit board, the first bearing and the second bearing cooperating to support the rotor shaft for rotation relative to the stator, wherein the printed circuit board includes a board portion and an encasement portion substantially encasing the board portion, the second bearing in direct contact with the encasement portion.

24. An electric motor as set forth in claim 23 wherein the stator is arranged to define a C-frame motor.

25. An electric motor as set forth in claim 23 wherein the rotor comprises a rotor core and the rotor shaft comprises a first end on a first side of the core and a second end on a second side of the core, the second side opposite the first side, the first bearing coupled to the first end and the second bearing coupled to the second end.

26. An electric motor as set forth in claim 23 wherein the printed circuit board comprises a bearing surface that defines an aperture sized to receive at least a portion of the second bearing.

27. An electric motor as set forth in claim 26 wherein the printed circuit board comprises a wear-resistant layer disposed between the bearing surface and the second bearing.

28. An electric motor as set forth in claim 27 wherein the wear-resistant layer is plated to the bearing surface.

29. An electric motor as set forth in claim 23 further comprising a fastener connecting the support member to the stator, and the printed circuit board to the stator.

30. An electric motor as set forth in claim 29 wherein the fastener passes through the support member and the printed circuit board.

31. An electric motor as set forth in claim 23 wherein the printed circuit board completely supports the second bearing.

32. An electric motor as set forth in claim 23 wherein the printed circuit board and the stator cooperate to inhibit movement of the bearing in a direction parallel to the rotor shaft and the printed circuit board substantially inhibits movement of the second bearing perpendicular to the rotor shaft.

* * * * *